US005665506A

United States Patent [19]
Kashima et al.

[11] Patent Number: 5,665,506
[45] Date of Patent: Sep. 9, 1997

[54] TONER FOR THE DEVELOPMENT OF ELECTROSTATIC IMAGE AND PROCESS FOR THE PREPARATION THEREOF

[75] Inventors: Koichi Kashima; Hajime Yamazaki; Shinji Otani; Kiyokazu Takasou; Makoto Nagaoka; Hiroshi Hamada, all of Kanagawa, Japan

[73] Assignee: Hodogaya Chemical Co., Ltd., Kawasaki, Japan

[21] Appl. No.: 593,521

[22] Filed: Jan. 30, 1996

[30] Foreign Application Priority Data

Jan. 31, 1995 [JP] Japan ................... 7-032811

[51] Int. Cl.$^6$ ................................ G03G 9/087
[52] U.S. Cl. ........................... 430/106; 430/137
[58] Field of Search ..................... 430/106, 110, 430/111, 137

[56] References Cited

U.S. PATENT DOCUMENTS 4,702,988 10/1987 Fukumoto et al. ............. 430/137
5,474,870 12/1995 Yamazaki et al. ............. 430/111

FOREIGN PATENT DOCUMENTS 2 278 454 11/1994 United Kingdom .

OTHER PUBLICATIONS

Patent Abstracts of Japan, vol. 12, No. 361 (P-763) [3208], Sep. 28, 1988, JP-A-63 113 561, May 18, 1988.

*Primary Examiner*—John Goodrow
*Attorney, Agent, or Firm*—Oblon, Spivak, McClelland, Maier & Neustadt, P.C.

[57] ABSTRACT

Disclosed is a process for preparing a particulate toner for developing an electrostatic image, which comprises suspending a polymerizable monomer composition comprising a polymerizable monomer, a resin dissolved therein, and a coloring agent in an aqueous medium not containing a dispersant to prepare a pre-suspension, jetting the pre-suspension through a nozzle under elevated pressure in a flowing direction which is forced to vary so that the pre-suspension collides with a predetermined plane or with each other, and then immediately passing the pre-suspension through an apparatus for throttling the path to produce back pressure and shearing stress to prepare a suspension containing a particulate polymerizable monomer and subjecting the resulting suspension to polymerization. The toner prepared by the process is a high performance toner which is free of finely divided grains and emulsion, exhibits a high chargeability, a uniform chargeability distribution, an excellent environmental stability and a high definition, and is insusceptible to fogging and unevenness.

4 Claims, No Drawings

TONER FOR THE DEVELOPMENT OF ELECTROSTATIC IMAGE AND PROCESS FOR THE PREPARATION THEREOF

FIELD OF THE INVENTION

The present invention relates to a toner for the development of an electrostatic image formed by electrophotographic process, electrostatic recording process, electrostatic printing process, etc. and a process for the preparation thereof.

BACKGROUND OF THE INVENTION

Heretofore, as a toner for the development of an electrophotographic image there has been normally used a particulate toner prepared by a process which comprises dispersing a coloring agent such as dye and pigment, and optionally a magnetic material, a charge controlling agent and in offset inhibitor (lubricant) in a thermoplastic resin in molten admixture, cooling and solidifying the dispersion, finely grinding the solid, and then classifying the grains to obtain a particulate toner having a predetermined grain diameter.

However, the recent trend of image formation is for higher definition. It has been found that this requirement can be effectively met by reducing the grain diameter of the particulate toner and narrowing the distribution of grain diameter.

As the grain diameter of the particulate toner is reduced by the foregoing grinding method, some problems have occurred. Firstly, the present grinding method consumes a huge energy to produce a particulate toner having a reduced grain diameter or narrowed distribution of grain diameter. Further, the produced particulate toner has a broad distribution of grain size and thus tends to include a large amount of unnecessary extremely finely divided powder which essentially requires classification process. However, it is extremely difficult to remove such an extremely finely divided powder by classification, reducing the productivity and hence the yield. The resulting toner is inevitably available at higher cost.

Secondly, it is difficult to homogeneously disperse a coloring agent or other additives in a resin at kneading process. The particulate toner with a reduced grain diameter produced by the grinding process is liable to greater scattering of chargeability due to the maldispersion of a coloring agent, a charge controlling agent, etc., coupled with the reduction of the grain diameter of the toner. This leads to the reduction of definition. Thirdly, the thus-obtained toner does not have uniformity in shape of the grains because it is a product of grinding. This not only causes the reduction of the fluidity of the toner but also produces a finely divided powder when re-ground by agitation upon development. The finely divided powder thus produced causes filming on the carrier and photoreceptor, resulting in the reduction of durability.

For this reason, various polymerization process toners have recently been proposed to eliminate the disadvantages of the grinding process. In particular, the production of toner by suspension polymerization process is advantageous in the control of grain diameter and the reduction of cost and is now under extensive development. However, some problems characteristic of suspension polymerization process have occurred. The suspension polymerization process requires the addition of a dispersant and a stabilizer to the aqueous system to accomplish stable suspension free from agglomeration or destruction of grains. In particular, the addition of a dispersant inhibits the agglomeration or destruction of grains during suspension or polymerization.

However, the addition of a dispersant entails the necessity of rinsing the toner to remove the residual dispersant from the surface of the particulate toner. The residual dispersant on the surface of the particulate toner not only deteriorates the stability of chargeability but also hinders the environmental stability. Further, a large amount of rinsing water or a large amount of rinsing water containing alcohol is required to remove the dispersant. Nevertheless, complete removal of the dispersant is difficult. Moreover, the Use of a dispersant presents a problem of increase of the amount of finely divided grains and production of a large amount of an emulsion. The presence of a large amount of an emulsion or finely divided grains causes the drop in the image density during running, requiring classification treatment.

JP-A-6-33256 (the term "JP-A" as used herein means an unexamined published Japanese Patent Application), which corresponds to U.S. Pat. No. 5,474,870, discloses a process which comprises (1) making a mixed solution collide with each other or with a predetermined plane, (2) immediately passing the mixed solution through an apparatus for throttling the path such that some back pressure and shearing stress acts on the mixed solution, to thereby prepare grains having an average grain diameter of 4 µm to 8 µm, including those having a grain diameter of 3 µm to 12 µm necessary for dry electrophotographic developing toner in a proportion of 13 to 350 % higher than the conventional process, and an extremely narrow distribution of grain size and comprising various additives dispersed therein through less passes than the conventional process, and (3) polymerizing the grains to prepare a toner for developing an electrostatic image that can provide a high definition without any fog and unevenness at a high productivity and a low manufacturing cost.

As mentioned above, when the production of a particulate toner for the development of an electrostatic image is effected in a dispersant-containing system even by the suspension polymerization process proposed in JP-A-6-33256, some problems such as widening of the distribution of grain size and deterioration of stability of chargeability and environmental stability of the toner are left unresolved.

SUMMARY OF THE INVENTION

It is therefore an object of the present invention to provide a suspension polymerization process toner for developing an electrostatic image, the toner being excellent in chargeability stability and environmental stability and having an average grain diameter of from 4 µm to 8 µm, which is suitable for high definition, and an extremely narrow grain size distribution, and a process for the preparation thereof.

The foregoing object of the present invention will become more apparent from the following detailed description and examples.

(1) The present invention provides a process for preparing a particulate toner for developing an electrostatic image, which comprises suspending a polymerizable monomer composition comprising a polymerizable monomer, a resin dissolved therein, and a coloring agent in an aqueous medium not containing a dispersant to prepare a pre-suspension, jetting the pre-suspension through a nozzle under elevated pressure in a flowing direction which is forced to vary so that the pre-suspension collides with a predetermined plane or with each other, and then immediately passing the pre-suspension through an apparatus for throttling the path to produce back pressure and shearing stress to prepare a suspension containing a particulate polymerizable monomer and subjecting the resulting suspension to polymerization.

(2) The present invention also provides the process recited in (1) above, wherein the content of the resin is from 1 to 50 % by weight based on the total amount of the polymerizable monomer and the resin.

(3) The present invention further provides the process recited in (1) or (2) above, wherein the polymerizable monomer comprises at least styrene and the resin dissolved therein is a styrene-soluble resin.

(4) The present invention still further provides the process recited in (1), (2) or (3), wherein the polymerizable monomer composition has a viscosity of from 3 c.p. to 10,000 c.p. at 25° C.

In general, a toner is required to have and retain a large electrostatic charge amount as electrical properties. For obtaining a toner having a large charge amount, it is indispensable to increase the proportion of grains having a small grain size and uniform surface. In the present invention, the addition of the resin imparts uniformity of the surface to the toner. For retaining a large charge amount, it is necessary that the toner itself has high electrical resistance. It is known that the addition of a surfactant remarkably reduces the resistance of the toner. The toner not containing a surfactant according to the present invention has excellent capability of obtaining and retaining a large charge amount. Furthermore, the process of the present invention provides a toner having extremely narrow distribution of grain size.

The present invention still further provides a particulate toner for the development of an electrostatic image, prepared by any one of the foregoing preparation processes.

DETAILED DESCRIPTION OF THE INVENTION

The inventors made extensive studies of the foregoing suspension polymerization process for the preparation of a particulate toner, and found a process which enables the stable production of a high performance toner which is free of finely divided grains and emulsion, exhibits a high chargeability, a uniform chargeability distribution, an excellent environmental stability and a high definition, and is insusceptible to fogging and unevenness with a high productivity and at a low cost. The process comprises dispersing a polymerizable monomer composition comprising a polymerizable monomer, a resin dissolved therein, and a coloring agent in an aqueous medium not containing a dispersant to prepare a pre-suspension, jetting the pre-suspension through a nozzle under elevated pressure in a flowing direction which is forced to vary so that the pre-suspension collides with a predetermined plane or with each other, and then immediately passing the pre-suspension through an apparatus for throttling the path to produce back pressure and shearing stress to prepare a suspension containing a particulate polymerizable monomer and subjecting the resulting suspension to polymerization.

Further, by controlling the viscosity of the foregoing polymerizable monomer composition to from 3 c.p. to 10,000 c.p., preferably from 5 c.p. to 1,000 c.p. at 25° C., a high performance toner having a narrower grain diameter distribution can be produced.

In accordance with the foregoing process of the present invention, a mixture of a part of a polymerizable monomer, a resin soluble in the monomer, a coloring agent, and optionally a charge controlling agent, is subjected to dispersion with stirring by means of a high performance disperser such as a paint shaker. Subsequently, to the dispersion is added the rest of the polymerizable monomer. The mixture is then stirred by means of an ordinary agitator such Heidon three-one motor available from Sintokagaku K.K. The mixture is then added to a dispersing medium comprising water and a stabilizer and not containing a dispersant. The mixture is then subjected to pre-suspension by means of a high speed agitator such as T.K. autohomomixer (available from Tokushu Kika Kogyo K.K.) to form oil drops having an average grain diameter of from 30 µm to 50 µm.

The pre-suspended mixture (sometimes referred to as pre-suspension) is then jetted through a nozzle under elevated pressure. The resulting jet is then introduced into a Z-shaped chamber or the like in a flowing direction which is forced to vary so that it is allowed to collide with a predetermined plane, followed by the passage through a throttling apparatus. Alternatively, the resulting jet is then introduced into a Y-shaped interaction chamber where it is divided into a plurality streams which are then allowed to collide with each other, followed by the passage through a throttling apparatus. In this manner, suspended grains having an average grain diameter from 4 µm to 8 µm are produced. Eventually, the suspended grains are allowed to undergo polymerization reaction to solidify the polymerizable monomer. Thereafter, the solidified material is subjected to rinsing or the like to remove the stabilizer therefrom, and then dried to obtain the desired toner.

For example, the pre-suspension containing oil drops having an average grain diameter of from 30 µm to 50 µm is processed under a processing pressure of generally from 1,000 psi to 18,000 psi by means of a high pressure collision type emulsifier such as the apparatus disclosed in U.S. Pat. No. 4,533,254 (trade name: Microfluidizer), and immediately acted on (1) by a back pressure of 0.1% to 50% (preferably 0.2% to 20%) of the processing pressure through various valves or (2) by a shearing stress and back pressure produced by adjusting the flow rate to 100 m/min to 2,000 m/min (preferably 200 m/min to 1200 m/min) through a capillary having a length of not less than 0.5 m. Thus, a suspension containing oil droplets having an average grain diameter of 4 to 8 µm and extremely narrow grain diameter distribution can be used.

In the present invention, the method for dissolving or dispersing the foregoing resin, coloring agent and charge controlling agent in the polymerizable monomer is not limited. For example, any of a ball mill, an attritor, an oscillating mill, a sand mill, a three-roll mill and an ultrasonic homogenizer which are used in ordinary solid-liquid dispersion may be used.

As the resin soluble in the polymerizable monomer employable herein there may be used either a polar resin or a non-polar resin. Examples of such a resin include a homopolymer of styrene and a substituted product thereof such as polystyrene, poly-P-chlorostyrene and polyvinyl toluene, styrene multiple copolymer such as styrene-P-chlorostyrene copolymer, styrene-propylene copolymer, styrene-vinyltoluene copolymer, styrene-vinylnaphthalene copolymer, styrene-methyl acrylate copolymer, styrene-ethyl acrylate copolymer, styrene-butyl acrylate copolymer, styrene-octyl acrylate copolymer, styrene-methyl methacrylate copolymer, styrene-ethyl methacrylate copolymer, styrene-butyl methacrylate copolymer, styrene-methyl α-chloromethacrylate copolymer, styrene-acrylonitrile copolymer, styrene-vinyl methyl ether copolymer, styrene-vinyl ethyl ether copolymer, styrene-vinyl methyl ketone copolymer, styrene-butadiene copolymer, styrene-isoprene copolymer, styrene-acrylonitrile-indene copolymer, styrene-maleic acid copolymer, styrene maleate copolymer, styrene acrylate methacrylate copolymer and styrene acrylate-dibutyl fumarate copolymer, polymethacrylate, polybutyl methacrylate, polyvinyl chloride, polyvinyl acetate, polymethyl ethylene, polyurethane, polyamide, epoxy resin, polyvinyl butyral, polyacrylic resin, rosin, modified rosin, terpene resin, phenolic resin, aliphatic or alicyclic hydrocarbon resin, and aromatic petroleum resin. These resins may be used singly or in combination. The weight-average molecular weight (Mw) of the resin to be used in the present invention is preferably from 5,000 to 50,000, more preferably from 30,000 to 50,000.

Specific examples of the resin soluble in the polymerizable monomer useful in the present invention will be given below, but the present invention should not be construed as being limited thereto. Specific examples of the resin include P-5998, P-5999, P-6000, P-6007 (available from Sekisui Chemical Co., Ltd.), CPR-100, CPR-110, CPR-120 (available from Mitsui Toatsu Chemicals, Inc.), Clearon P-85, Clearon P-105, Clearon P-115, Clearon M-105, and Clearon M-115 (available from Yasuhara Chemical Co., Ltd.).

The amount of such a resin to be incorporated in the polymerizable monomer is preferably from 1 to 50% by weight, more preferably from 5 to 25% by weight based on the total amount to the polymerizable monomer and the resin. Particularly preferred among these resins are those having an acid component.

Preferred examples of the polymerizable monomer employable in the present invention include styrene monomers such as styrene, o-methylstyrene, m-methylstyrene, p-methylstyrene, α-methylstyrene, p-ethylstyrene, 2,4-dimethylstyrene, p-butylstyrene, p-t-butylstyrene, p-hexylstyrene, p-octylstyrene, p-nonylstyrene, p-decylstyrene, p-dodecylstyrene, p-methoxystyrene, p-phenylstyrene, p-chlorostyrene and 3,4-dichlorostyrene. Other examples of radically polymerizable monomers employable in the present invention include ethylenically unsaturated monoolefins such as ethylene, propylene, butylene and isobutylene, halogenated vinyls such as vinyl chloride, vinylidene chloride, vinyl bromide and vinyl fluoride, vinylesters such as vinyl acetate, vinyl propionate, vinyl benzoate and vinyl butyrate, α-methylene aliphatic monocarboxylic esters such as methyl acrylate, ethyl acrylate, butyl acrylate, propyl acrylate, acrylate, dodecyl acrylate, lauryl acrylate, 2-ethylhexyl acrylate, stearyl acrylate, 2-chloroethyl acrylate, phenyl acrylate, methyl α-chloroacrylate methyl methacrylate, ethyl methacrylate, propyl methacrylate, butyl methacrylate, isobutyl methacrylate, octyl methacrylate, dodecyl methacrylate, lauryl methacrylate, 2-ethylhexyl methacrylate, stearyl methacrylate, phenyl methacrylate, dimethylaminoethyl methacrylate and diethylaminoethyl methacrylate, acrylic acid or methacrylic acid derivatives such as acrylonitrile, methacrylonitrile and acrylamide, vinylethers such as vinyl methyl ether, vinyl ethyl ether and vinyl isobutyl ether, vinyl ketones such as vinyl methyl ketone, vinyl hexyl ketone and methyl isopropenyl ketone, N-vinyl compounds such as N-vinylpyrrole, N-vinylcarbazole, N-vinylindole and N-vinylpyrrolidone, and vinyl naphthalenes. These monomers may be used singly or in combination. These monomers may also be used in such a Combination that they are polymerized to give a copolymer.

For the polymerization of the foregoing monomer, a radical polymerization initiator is normally used in an amount of from 0.1 to 10% by weight based on the weight of the radically polymerization monomer. The optimum amount of the radical polymerization initiator may be determined by the final polymerization degree.

Specific examples of such a polymerization initiator include peroxides such as acetylcyclohexylsulfonyl peroxide, isobutyl peroxide, diisopropylperoxy dicarbonate, di-2-ethylhexylperoxy dicarbonate, 2,4-dichlorobenzoyl peroxide, 1-butylperoxy pivalate, 3,5,5-trimethylhexanoyl peroxide, octanoyl peroxide, stearoyl peroxide, propionyl peroxide, succinic acid peroxide, acetyl peroxide, t-butylperoxy-2-ethylhexanoate, benzoyl peroxide, parachlorobenzoyl peroxide, t-butylperoxy isobutyrate, t-butylperoxymaleic acid, t-butylperoxy laurate, cyclohexanone peroxide, t-butylperoxyisopropyl carbonate, 2,5-dimethyl-2,5-dibenzoylperoxyhexane, t-butylperoxyacetate, t-butylperoxybenzoate, diisobutyldiperoxyphalate, methyl ethyl ketone peroxide, dicumyl peroxide, 2,5-dimethyl-2,5-di-t-butylperoxyhexane, t-butylcumyl peroxide, t-butyl hyrdroperoxide, di-t-butyl peroxide, 2,5-dimethyl-2,5-di-t-butylperoxyhexane, diisopropylbenzene hydroperoxide, paramethane hydroperoxide, pinane hydroperoxide, 2,5-dimethylhexane-5-dihydroperoxide and cumen hydroperoxide, and azo compounds such as 2,2'-azobisisobutyronitrile, 1,1'-azobis(cyclohexane-1-carbonitrile), 2,2'-azobis(4-methoxy-2,4-dimethylvaleronitrile), 2,2'-azobis(2,4-dimethylvaleronitrile), 2,2'-azobis(2-cyclopropylpropionitrile), 2,2'-azobis(2-methylbutyronirile) and dimethyl-2,2'-azobis (2-methylpropionate).

Further, a polar polymer or an elastomeric polymer may be added to the system during polymerization to improve the physical properties of the polymer toner.

The polymer according to the present invention may be crosslinked polymer obtained by the polymerization of monomers in the presence of a crosslinking agent. A crosslinking agent which can be preferably used in the present invention is a compound mainly having two or more polymerizable double bonds. Examples of such a compound include aromatic divinyl compounds such as divinylbenzene, divinyl-naphthalene, and derivatives thereof. Specific examples of these aromatic divinyl compounds include diethylenically carboxylic esters such as ethyleneglycol dimethacrylate, diethyleneglycol dimethacrylate, triethyleneglycol dimethacrylate, trimethylol propanetriacrylate, allylmethacrylate, tetraethyleneglycol dimethacrylate and 1,3-butanediol dimethacrylate, various divinyl compounds such as N,N-divinylaniline, divinylether, divinylsulfide and divinylsulfone, and compounds having three or more vinyl groups. These compounds may be used singly or in combination.

The amount of such a crosslinking agent to be incorporated in the monomer is generally in the range of from 0.005% to 20% by weight, preferably from 0.1% to 5% by weight. If this amount exceeds the above specified range, it tends to raise the softening point of the toner, deteriorating fixability of the toner. On the contrary, if this amount falls below the above specified range, it is liable to be difficult to impart properties necessary for toner such as durability and abrasion resistance to the toner. In particular, it reduces the effect of the expansion of the distribution of molecular weight of the polymer by crosslinking and the effect of inhibiting offset during fixing by the nature of crosslinked polymer toner itself in heat roll fixing process copying machines or the like.

An offset inhibitor can be used in the form of uniform dispersion. Examples thereof include a wax such as paraffin wax and a low softening point compound which has releasable property such as low molecular polyolefin. The low molecular polyolefin to be used in the present invention may be either a polymer obtained from a single olefin monomer or a copolymer obtained by the copolymerization of an olefin monomer with other monomers copolymerizable therewith.

As the olefin monomer, any olefin monomer can be used, but examples thereof include ethylene, propylene, 1-butene, 1-pentene, 1-hexene, 1-heptene, 1-octene, 1-nonene, 1-decene, and other isomers having different position of an unsaturated bond. These monomers may be those having a branch composed of an alkyl group such as 3-methyl-1-butene, 3-methyl-2-pentene, and 3-propyl-5-methyl-2-hexene. Particularly preferred among these olefin monomers are ethylene and propylene.

Examples of the other monomers copolymerizable with the olefin monomer include other olefin monomers, vinyl ethers, vinyl esters, haloolefins, ester acrylates, ester methacrylates, acrylic acid derivatives and organic acids such as itaconic acid.

Further, modified polyolefins obtained by blocking polyolefins by other components or grafting other components Specific examples of the low softening point compound useful in the present invention will be given below, but the present invention should not be construed as being limited thereto. Examples thereof include Biscol 330P, Biscol 550P, Biscol 660P (polypropylene available from Sanyo Chemical Industries, Ltd.), Hiwax 320P, Hiwax 310P, Hiwax 410P, Hiwax 405P, Hiwax 400P, Hiwax 200P (polyethylene available from Mitsui Petrochemical Industries, Ltd.), Sanwax 131P, Sanwax 151P, Sanwax 161P, Sanwax 165P, Sanwax 171P (polyethylene available from Sanyo Chemical Industries, Ltd.), Polywax 400, Polywax 500, Polywax OH465, and Polywax 1040 (polyethylene available from Toyo Petrite Co., Ltd.).

The low softening point compound may be used singly or in combination of two or more thereof. The optimum amount of such a low softening point compound to be used is preferably from 1 to 10% by weight, particularly from 2 to 7% by weight based on the weight of the polymerizable monomer.

The polymerizable monomer composition according to the present invention comprises a coloring agent incorporated therein. As such a coloring agent there may be preferably used a dye pigment or particulate magnetic substance. As such a dye pigment there can be used a known dye or a known pigment such as carbon black and grafted carbon black obtained by covering the surface of carbon black by a resin. The amount of such a dye pigment to be incorporated is in the range of 0.1% to 20% by weight based on the weight of the polymerizable monomer.

As the particulate magnetic material there may be used any magnetic material which has heretofore been used for magnetic toner. For example, various metals such as nickel and cobalt, various alloys of iron, nickel, cobalt, manganese, copper and aluminum such as ferrite and magnetite, and oxides thereof may be used in the form of finely divided powder having a grain diameter of from about 0.1 to 5 μm, preferably from 0.1 to 1 μm. Specific examples of such a magnetic material include RB-BL, BL-50, BL-100, BL-200, BL-250, BL-500, BL-SP (available from Titan Kogyo K.K.), EPT-500, EPT-1000, MBM-B-450, and MTC-720 (available from Toda Kogyo Corp.). Such a particulate magnetic material is incorporated generally in an amount of from 20 to 70% by weight of the toner, preferably from 35 to 5% by weight. Such a particulate magnetic material may be treated with a known surface modifier or an appropriate reactive resin.

The toner may comprise a charge controlling agent and a fluidity modifier incorporated therein as necessary. The charge controlling agent and fluidity modifier may be mixed with the toner grains. Examples of such a charge controlling agent include metal complexes of organic compounds containing a carboxyl group or a nitrogen-containing group, metal-containing dyes, nigrosine, and alkylonium salts. As the fluidity modifier or cleaning aid for the surface of a latent image carrier (photoreceptor) there may be used colloidal silica, aliphatic metal salt or the like. The toner may comprise a filler such as calcium carbonate and finely divided silica grains in an amount of 0.5% to 20% by weight based on the amount of the toner for the purpose of filling the toner.

An oil phase mainly composed of the foregoing polymerizable monomer needs to be stably dispersed in water with a desired grain diameter and in a desired grain size distribution. Examples of a stabilizer for this purpose include polyvinyl alcohol, gelatin, methyl cellulose, methylhydropropyl cellulose, ethyl cellulose, sodium salt of carboxymethyl cellulose, polyacrylic acid, salts thereof, starch, gum, alginate, zein, casein, calcium tertiary phosphate, talc, barium sulfate, bentonite, aluminum hydroxide, and ferric hydroxide. The appropriate amount of such a stabilizer depends on the amount of the polymerizable monomer as an oil phase and the amount of water as the suspension medium, but the preferred amount of such a stabilizer is in the range of 1% to 20% by weight based on the weight of water.

The amount of water to be used during suspension is preferably in the range of 2.5 times to 6 times the weight of polymerizable monomer as main component. As water to be used, ion-exchanged water less contaminated by salts is desirable.

In the present invention, a dispersant such as a surfactant (typical examples include sodium dodecylbenzenesulfonate and sodium tetradecylsulfate), which is generally used in combination with the stabilizer described above, is not used at any step where grains comprising the polymerizable monomer are suspended in an aqueous medium.

The present invention, after the formation of oil drops by suspension, a polymerization reaction is initiated at a temperature of about 50° C. to 80° C. by an ordinary method. Finally, the reaction is completed at a temperature of 90° C. to 100° C. After cooling, the material is washed with water to remove the stabilizer, dried at a temperature of 40° C. to 50 ° C., milled, and then optionally treated with a surface treating agent to obtain a toner in a high yield.

The polymerization toner prepared by the present invention is applicable to known dry type methods for developing an electrostatic image, and can be used especially as a high difinition toner which is required to have a sharp grain distribution and a small grain size having a mean grain size of 4 to 8 μm.

If the toner according to the present invention is used as a binary developer (two component development), a carrier commonly used for toner may be used. In some detail, an iron powder carrier or ferrite carrier may be used. Further, a resin-coated carrier obtained by covering such a material as a core by a polyester resin, fluorinic resin or silicone resin or a so-called resin carrier obtained by kneading iron powder or ferrite with a binder resin to effect granulation may be used.

If the toner of the present invention is used as a unitary developer, a fluidity modifier and a cleaning aid may be added thereto before use as previously mentioned. As such a fluidity modifier there may be used hydrophobic silica, an oxidation product of titanium, aluminum, calcium or magnesium, a product prepared by subjecting the oxidation product to hydrophobic treatment with a titanium coupling agent, a silane coupling agent, polyvinylidene fluoride, or metal soap, in the form of finely divided powder. As the cleaning aid there may be used a metallic salt of higher aliphatic acid such as zinc stearate, calcium stearate and magnesium stearate, polymethyl methacrylate, nylon, poly (ethylene tetrafluoride), silicon carbide, or aromatic ester such as pentaerythritol benzoate.

The present invention will be further described in the following examples and comparative examples, but the present invention should not be construed as being limited thereto. The terms "parts" and "%" as used herein are by weight.

The results of the following examples and comparative examples are set forth in Tables 1 and 2.

EXAMPLE 1

To 240 parts of a styrene monomer were added 27 parts of Carbon Black MA-100 (available from Mitsubishi Kasei Corp.), 5 p,arts of Aizen Spiron Black TRH (available from Hodogaya Chemical Co., Ltd.), and 60 parts of a resin P-5999 produced by Sekisui Chemical Co., Ltd. (kind of monomer: styrene-butyl acrylate-maleic acid; Mw: 85,000; acid component: 5%). To the mixture was then added glass beads. The mixture was then subjected to dispersion by means of a paint shaker for 45 minutes to obtain Mixture A. Subsequently, to a mixture of 100 parts of a styrene monomer and 25 parts of 2-ethylhexyl acrylate were added 1 part of divinylbenzene, 15 parts of 2,2-azobis(2,4-dimethyl) valeronitrile, 3 parts of azobisisobutylonitrile, and 190 parts of Mixture A. The mixture was then stirred for 30 minutes to obtain an oil phase mainly composed of a polymerizable monomer and having a viscosity of 1,000 cps at 25° C. On the other hand, a dispersion medium containing 254 parts of a 10% calcium tertiary phosphate solution (available from Taihei Kagaku Sangyo K.K.) and 820 parts of ion-exchanged water was prepared. To the dispersion medium were added 315 parts of the oil phase previously prepared. The mixture was then subjected to pre-suspension at a temperature of from 3° C. to 10° C. at 3,000 for 15 minutes and then at 4,000 rpm for 20 minutes by means of a T.K. autohomomixer (Tokushu Kika Kogyo K.K.) to obtain a pre-suspension.

The pre-suspension was then passed once and twice through a suspension apparatus, composed of Microfluidizer M-110T (available from Microfluindex Corp. of U.S.A.) equipped with a Z-shaped chamber and a needle valve connected to the product outlet of Microfluidizer M-110T, under a processing pressure of 8,000 psi and a back pressure of 25 psi to obtain Suspension $S_1$ and Suspension $S_2$, respectively.

Separately, the same pre-suspension was passed once and twice through a suspension apparatus, composed of a liquid flow collision type Y-shaped interaction chamber (available from Microfluindex Corp. of U.S.A.) and a needle valve connected to the product outlet of the interaction chamber, under a processing pressure of 8,000 psi and a back pressure of 25 psi to obtain Suspension $S_3$ and Suspension $S_4$, respectively.

Suspensions $S_1$ to $S_4$ each was transferred to an autoclave equipped with an agitator where it was then allowed to undergo a polymerization reaction at a temperature of 60° C. for 6 hours and at a temperature of 90° C. for 1 hour. The polymerization product was cooled, and then treated with hydrochloric acid so that calcium tertiary phosphate was disssolved therein. The reaction system was filtered off, washed with water until the pH value of the filtrate reached neutral zone, and then dried to obtain a toner. Thus, Toners $T_1$ to $T_4$ were prepared from Suspensions $S_1$ to $S_4$, respectively.

These toners each comprised the grains being almost spherical and did not exhibit color unevenness.

Toners $T_1$ to $T_4$ were measured for grain diameter by means of a Coulter Counter manufactured by COULTER ELECTRONICS, INC. The results are set forth in Table 1.

These toners were measured for triboelectrification distribution with an iron powder carrier DSP-128 (available from Dowa Teppun K.K.) by means of Espert Analyzer EST-1 available from Hosokawa Micron Corporation). As a result, very sharp negative electrification distribution was shown free of opposite polarity.

100 parts of each toner was mixed with 1 part of colloidal silica. 7.5 parts of the resulting toner was then with 22.5 parts of a magnetic powder DFC-200 (available from Dowa Teppun K.K.) as a carrier. Thus, four kinds of developers were prepared. A commercially available copying machine was used to evaluate these developers for printing properties. In the initial stage of running, a high definition printed matter with a high sharpness was obtained free of fog and unevenness. These developers were then subjected to running. As a result, all these developers showed no density drop and maintained a good image quality up to 2,000 sheets. The results are set forth in Table 1.

EXAMPLE 2

A toner was prepared in the same manner as the preparation of Toner $T_2$ in Example 1 except that the added amount of the resin P-5999 was changed from 60 parts to 30 parts. The thus-obtained toner was then measured for grain diameter by means of a Coulter Counter. As a result, it was found that the particulate toner had a narrow grain diameter distribution as shown in Table 1 and comprised a pigment homogeneously dispersed therein. The toner grains were almost spherical and were also free of color unevenness. The toner was measured for triboelectrification distribution with an iron powder carrier DSP-128 (available from Dowa Teppun K.K.) by means of Espert Analyzer EST-1 (available from Hosokawa Micron Corporation). As a result, very sharp negative electrification distribution was shown free of opposite polarity. Hundred parts of the toner were mixed with 1 part of colloidal silica. 7.5 parts of the resulting toner was then mixed with 22.5 parts of a magnetic powder DFC-200 (available from Dowa Teppun K.K.) as a carrier to prepare a developer. A commercially available unitary printer was used to evaluate the developer for printing properties. In the initial stage of running, a high definition printed matter with a high sharpness was obtained free of fog and unevenness. The toner was then subjected to running. As a result, the developer showed no density drop and maintained a good image quality up to 2,000 sheets.

EXAMPLE 3

A toner was prepared in the same manner as the preparation of Toner $T_2$ in Example 1 except that 60 parts of Magnetite BL-220 (available from Titan Kogyo K.K.) were used instead of 27 parts of Carbon Black MA-100 (available from Mitsubishi Kasei Corp.). The thus-obtained toner was then measured for grain diameter by means of a Coulter Counter. As a result, it was found that the particulate toner had a narrow grain diameter distribution as shown in Table 2 and comprised a pigment homogeneously dispersed therein. The toner grains were almost spherical and were also free of color unevenness. The toner was measured for triboelectrification distribution with an iron powder carrier DSP-128 (available from Dowa Teppun K.K.) by means of Espert Analyzer EST-1 (available from Hosokawa Micron Corporation). As a result, very sharp negative electrification distribution was shown free of opposite polarity. Hundred parts of the toner were mixed with 1 part of colloidal silica. 7.5 parts of the resulting toner was then mixed with 22.5 parts of a magnetic powder DFC-200 (available from Dowa Teppun K.K.) as a carrier to prepare a developer. A commercially available binary printer was used to evaluate the developer for printing properties. In the initial stage of running, a high definition printed matter with a high sharpness as obtained free of fog and unevenness. The toner was then subjected to running. As a result, the developer showed no density drop and maintained a good image quality up to 2,000 sheets.

COMPARATIVE EXAMPLE 1

A toner was prepared in the same manner as the preparation of Toner $T_2$ in Example 1 except that 100 parts of a 0.178% aqueous solution of sodium dodecylbenzenesulfonate were added to the dispersing medium. The thus-obtained toner was then measured for grain diameter by means of a Coulter Counter. As a result, it was found that the grain diameter of the particulate toner could not be reduced as compared with Toner $T_2$ of Example 1 and the toner had a broad grain diameter distribution as shown in Table 1. The dispersion of pigment grains in the particulate toner was nonuniform. The results of Comparative Example 1 are also set forth in Table 1. The thus-obtained toner was then used to prepare a developer. The developer was then evaluated for printing properties by means of a commercially available printer. Even in the initial stage of running, the resulting printed matter showed a poor density, sharpness and fine line reproducibility, some fog and unevenness.

COMPARATIVE EXAMPLE 2

A toner was prepared in the same manner as the reparation of Toner $T_2$ in Example 1 except that the resin P-5999 was not added. As a result, an oil phase and a disperse phase were completely separated after the completion of pre-suspension. Thus, suspended grains having a diameter of from 30 μm to 40 μm were not obtained.

COMPARATIVE EXAMPLE 3

A toner was prepared in the same manner as in Comparative Example 2 except that 100 parts of a 0.178% aqueous solution of sodium dodecylbenzenesulfonate were added to the dispersing medium. The thus-obtained toner was then measured for grain diameter by means of a Coulter Counter. As a result, it was found that the grain diameter of the particulate toner could not be reduced as compared with Toner $T_2$ of Example 1 and the toner had a broad grain diameter distribution as shown in Table 1. The dispersion of pigment grains in the particulate toner was nonuniform. The toner was then used to prepare a developer. The developer was then evaluated for printing properties by means of a commercially available printer. Even in the initial stage of running, the resulting printed matter showed a poor density, sharpness and fine line reproducibility, some fog and unevenness.

COMPARATIVE EXAMPLE 4

A toner was prepared in the same manner as in Example 3 except that 100 parts of a 0.178% aqueous solution of sodium dodecylbenzenesulfonate were added to the dispersing medium. The thus-obtained toner was then measured for grain diameter by means of a Coulter Counter. As a result, it was found that the grain diameter of the particulate toner could not be reduced as compared with Example 3 and the toner had a broad grain diameter distribution as shown in Table 2. The dispersion of pigment grains in the particulate toner was nonuniform. The toner was then used to prepare a developer. The developer was then evaluated for printing properties by means of a commercially available printer. Even in the initial stage of running, the resulting printed matter showed a poor density, sharpness and fine line reproducibility, some fog and unevenness.

COMPARATIVE EXAMPLE 5

A toner was prepared in the same manner as in Example 3 except that the resin P-5999 was not added. As a result, an oil phase and a disperse phase were completely separated after the completion of pre-suspension. Thus, suspended grains having a diameter of from 30 μm to 40 μm were not obtained.

COMPARATIVE EXAMPLE 6

A toner was prepared in the same manner as in Comparative Example 5 except that 100 parts of a 0.178% aqueous solution of sodium dodecylbenzenesulfonate were added to the dispersing medium. The toner was then measured for grain diameter by means of a Coulter Counter. As a result, it was found that the grain diameter of the particulate toner could not be reduced as compared with Example 3 and the toner had a broad grain diameter distribution as shown in Table 2. The dispersion of pigment grains in the particulate toner was nonuniform. The toner was then used to prepare a developer. The developer was then evaluated for printing properties by means of a commercially available printer. Even in the initial stage of running, the resulting printed matter showed a poor density, sharpness and fine line reproducibility, some fog and unevenness.

The initial image density and initial fog density shown in Tables 1 and 2 were evaluated according to the following methods.

(1) Initial Image Density

Apparatus: Macbeth reflection densitometer

Sample: Five sheets from the beginning of printing were used.

Condition: Ten black solid portions per one sheet were measured for density. The initial image density was defined as an average of the values obtained by measuring five sheets.

Good: not less than 1.4

Poor: less than 1.4

(2) Initial Fog Density

Apparatus: Minolta color difference meter

Sample: Five sheets from the beginning of printing were used.

Condition: A blank sheet of paper before printed was measured for density, and the obtained value was designated as a blank value. Ten white ground portions on the paper printed per one sheet were measured for density. The initial fog density was defined as the difference between an average of the value obtained by measuring five printed papers and the blank value.

Good: not more than 1.0

Poor: more than 1.0

TABLE 1

| | | Particulate Toner | | | | Developer | |
|---|---|---|---|---|---|---|---|
| Sample No. | | Volume-average Grain Diameter (μm) | Number-average Grain Diameter (μm) | Percent Production of Dp < 2 μm[1] (%) | Percent Production of Dp > 12 μm[2] (%) | Initial Image Density | Initial Fog |
| Example 1 | $T_1$ | 7.8 | 6.3 | 5.0 | 1.3 | Good | Good |
| | $T_2$ | 7.0 | 6.0 | 4.0 | 1.0 | Good | Good |
| | $T_3$ | 7.9 | 6.3 | 4.6 | 1.2 | Good | Good |
| | $T_4$ | 7.0 | 5.9 | 4.0 | 0.8 | Good | Good |
| Example 2 | | 7.0 | 6.0 | 4.0 | 1.0 | Good | Good |
| Comparative Example 1 | | 8.4 | 6.5 | 20.0 | 8.0 | Poor | Poor |
| Comparative Example 2 | | — | — | — | — | — | — |
| Comparative Example 3 | | 8.4 | 6.0 | 30.0 | 10.0 | Poor | Poor |

TABLE 2

| | Particulate Toner | | | | Developer | |
|---|---|---|---|---|---|---|
| Sample No. | Volume-average Grain Diameter (μm) | Number-average Grain Diameter (μm) | Percent Production of Dp < 2 μm[1] (%) | Percent Production of Dp > 12 μm[2] (%) | Initial Image Density | Initial Fog |
| Example 3 | 7.0 | 6.5 | 4.5 | 0.5 | Good | Good |
| Comparative Example 4 | 8.4 | 6.5 | 20.0 | 8.2 | Poor | Poor |
| Comparative Example 5 | — | — | — | — | — | — |
| Comparative Example 6 | 8.4 | 6.0 | 30.0 | 14.2 | Poor | Poor |

Note:
[1] Proportion of toner grains having a diameter less than 2 μm with respect to number distribution.
[2] Proportion of toner grains having a diameter larger than 12 μm with respect to volume distribution.

As mentioned above, the present invention can provide a high performance toner free of finely divided grains and emulsion which exhibits a high chargeability, a uniform chargeability distribution, an excellent environmental stability and a high definition and is insusceptible to fogging and unevenness.

While the invention has been described in detail and with reference to specific embodiments thereof, it will be apparent to one skilled in the art that various changes and modifications can be made therein without departing from the spirit and scope thereof.

What is claimed is:

1. A process for preparing a particulate toner for developing an electrostatic image, which comprises:

suspending a polymerizable monomer composition comprising a polymerizable monomer, a resin dissolved therein, and a coloring agent in an aqueous medium not containing a dispersant to prepare a pre-suspension, jetting the pre-suspension through a nozzle under elevated pressure in a flowing direction which is forced to vary so that the pre-suspension collides with a predetermined plane or with each other, then immediately passing the pre-suspension through an apparatus for throttling the path to produce back pressure and shearing stress to prepare a suspension containing a particulate polymerizable monomer, and subjecting the resulting suspension to polymerization, wherein the content of the resin is from 1 to 50% by weight based on the total amount of the polymerizable monomer and the resin.

2. The process of claim 1, wherein the polymerizable monomer composition has a viscosity of from 3 c.p. to 10,000 c.p. at 25° C.

3. A particulate toner for developing an electrostatic image, which is prepared according to a process for preparing a particulate toner for developing an electrostatic image, which comprises:

suspending a polymerizable monomer composition comprising a polymerizable monomer, a resin dissolved therein, and a coloring agent in an aqueous medium not containing a dispersant to prepare a pre-suspension, jetting the pre-suspension through a nozzle under elevated pressure in a flowing direction which is forced to vary so that the pre-suspension collides with a predetermined plane or with each other, then immediately passing the pre-suspension through an apparatus for throttling the path to produce back pressure and shearing stress to prepare a suspension containing a particulate polymerizable monomer, and subjecting the resulting suspension to polymerization, wherein the content of the resin is from 1 to 50% by weight based on the total amount of the polymerizable monomer and the resin.

4. The particulate toner for developing an electrostatic image of claim 3, wherein the polymerizable monomer composition has a viscosity of from 3 c.p. to 10,000 c.p. at 25° C.

* * * * *